(12) United States Patent
Matsuda et al.

(10) Patent No.: US 10,477,759 B2
(45) Date of Patent: Nov. 19, 2019

(54) GRASS MOWER

(71) Applicant: Kubota Corporation, Osaka-shi (JP)

(72) Inventors: Kazuaki Matsuda, Sakai (JP);
Katsuhiko Uemura, Sakai (JP);
Hirokazu Ito, Sakai (JP); Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 173 days.

(21) Appl. No.: 15/835,692

(22) Filed: Dec. 8, 2017

(65) Prior Publication Data

US 2018/0338417 A1 Nov. 29, 2018

(30) Foreign Application Priority Data

May 24, 2017 (JP) .................................. 2017-102819

(51) Int. Cl.
*A01D 34/00* (2006.01)
*A01D 34/66* (2006.01)
(Continued)

(52) U.S. Cl.
CPC ......... *A01D 34/008* (2013.01); *A01D 34/006* (2013.01); *A01D 34/668* (2013.01);
(Continued)

(58) Field of Classification Search
CPC ...... A01D 34/78; A01D 34/73; A01D 34/006; A01D 34/008; A01D 34/63; A01D 34/668; A01D 34/66; B60L 15/2045; B60W 30/1886; F02D 31/007; F02D 29/00; F02D 41/2422
(Continued)

(56) References Cited

U.S. PATENT DOCUMENTS 6,269,617 B1 * 8/2001 Blanchard ............ A01D 34/015
219/121.67
9,301,443 B2 4/2016 Hashima et al.
(Continued)

FOREIGN PATENT DOCUMENTS

EP 2639128 A2 9/2013
JP 2015136305 A 7/2015

*Primary Examiner* — Robert E Pezzuto
(74) *Attorney, Agent, or Firm* — The Webb Law Firm (57) ABSTRACT

A grass mower includes a vehicle speed instruction value calculation section (53) for generating a vehicle speed instruction value including a maximal vehicle speed, based on an operational position of a man-operable vehicle speed controlling tool (15), a mode selection section (70) for selecting a control mode from a plurality of control modes, a control table (52) in which a plurality of control parameters are set, a vehicle speed control target value calculation section (54) configured to calculate a vehicle speed control target value, based on a vehicle speed instruction value generated by the vehicle speed instruction value calculation section (53) and a selected control parameter corresponding to the control mode selected by the mode selection section (70), a cutter blade control target value calculation section (55) configured to calculate a rotational speed control target value for a cutter blade (30), based on the selected control parameter, and a cutter blade control section (4B) configured to control the cutter blade drive mechanism (31) based on the rotational speed control target value.

6 Claims, 6 Drawing Sheets

(51) Int. Cl.
*A01D 34/78* (2006.01)
*B60L 15/20* (2006.01)
*B60W 30/188* (2012.01)
*A01D 101/00* (2006.01)

(52) U.S. Cl.
CPC .......... *A01D 34/78* (2013.01); *B60L 15/2045* (2013.01); *B60W 30/1886* (2013.01); *A01D 2101/00* (2013.01); *B60L 2240/12* (2013.01); *B60L 2240/421* (2013.01); *B60W 2300/156* (2013.01)

(58) Field of Classification Search
USPC ............ 56/10.2 G, 10.2 R, 10.8; 701/22, 50
See application file for complete search history.

(56) References Cited

U.S. PATENT DOCUMENTS

| | | | |
|---|---|---|---|
| 2009/0069964 A1* | 3/2009 | Wyatt | B60L 3/00 701/22 |
| 2009/0201650 A1* | 8/2009 | Hauser | A01D 34/78 361/736 |
| 2012/0265391 A1* | 10/2012 | Letsky | A01D 34/008 701/25 |
| 2013/0047565 A1* | 2/2013 | Shida | A01D 34/44 56/10.2 H |
| 2013/0212995 A1* | 8/2013 | Ebihara | A01D 34/667 56/10.5 |
| 2015/0201556 A1 | 7/2015 | Ito et al. | |
| 2015/0289444 A1 | 10/2015 | Koike et al. | |

* cited by examiner

GRASS MOWER

CROSS REFERENCE TO RELATED APPLICATION

This application claims priority to Japanese Patent Application No. 2017-102819 filed May 24, 2017, the disclosure of which is hereby incorporated in its entirety by reference.

BACKGROUND OF THE INVENTION

1. Field of the Invention

This invention generally relates to a grass mower. More particularly, the invention relates to a grass mower including a drive wheel unit driven by a variable speed drive mechanism, and a mower unit having a cutter blade rotatably driven by a cutter blade drive mechanism.

2. Description of the Related Art

A grass mower disclosed in JP 2015-136305 A (or US 2015/0201556 A1 corresponding thereto) includes a plurality of cutter blades driven by rotational power, a power device capable of adjusting a rotational speed of this rotational power to be transmitted to the cutter blades, a cutter blade speed detecting means for detecting a ground speed of the cutter blades, and a control device for effecting energy saving control for increasing/decreasing a rotational speed of the rotational power to be transmitted to the cutter blades (cutter blade rotational speed) in accordance with increase/decrease of the ground speed of the cutter blades. In this, the ground speed of the cutter blades is calculated based on a speed and an angular velocity of a traveling vehicle body relative to the ground surface. With the grass mower configured as above, by increasing/decreasing the rotational power to be transmitted to the cutter blades in accordance with increase/decrease of the ground speed of the plurality of cutter blades, transmission of excessive rotational power to the cutter blades is avoided, thus improving the energy saving performance.

With this grass mower, the energy saving control is realized by increasing/decreasing a rotational speed of the cutter blades in accordance with increase/decrease in the ground speed of the cutter blades relative to the ground surface. However, grass cutting work requirement for a grass mower includes a work requirement which places importance on maximization of cutting performance even at the cost of reduction in the energy saving performance, a work requirement which places importance on ecology for obtaining high energy saving performance as well as noise reduction, and a work requirement that places importance on good balance between the energy saving performance and the cutting performance. In order to satisfy any one of such plurality of work requirements, a good driving skill for a grass mower will be needed.

In view of the above-described state of the art, there is a need for a grass mower that does not require high driving technique, yet allows implementation of a grass cutting work which satisfies an instructed work requirement. Then, there is proposed a grass mower as described below.

SUMMARY OF THE INVENTION

A grass mower comprising:
a drive wheel unit;
a variable speed drive mechanism for driving the drive wheel unit;
a mower unit having a cutter blade;
a cutter blade drive mechanism for rotatably driving the mower unit;
a man-operable vehicle speed controlling tool which is operated in a range from a zero vehicle speed position to a maximal vehicle speed position;
an operation detection section for detecting an operational position of the man-operable vehicle speed controlling tool;
a vehicle speed instruction value calculation section for generating a vehicle speed instruction value including a maximal vehicle speed, based on the operational position of the man-operable vehicle speed controlling tool detected by the operation detection section;
a mode selection section for selecting a control mode from a plurality of control modes;
a control table in which a plurality of control parameters are set, the control parameters being provided for the respective control modes, each of the control parameters including a rotational speed value of the cutter blade and a maximal vehicle speed value corresponding to the rotational speed value;
a vehicle speed control target value calculation section configured to calculate a vehicle speed control target value, based on a vehicle speed instruction value generated by the vehicle speed instruction value calculation section and a selected control parameter corresponding to the control mode selected by the mode selection section;
a traveling control section configured to control the variable speed drive mechanism based on the vehicle speed control target value;
a cutter blade control target value calculation section configured to calculate a rotational speed control target value for the cutter blade, based on the selected control parameter; and
a cutter blade control section configured to control the cutter blade drive mechanism based on the rotational speed control target value.

In this grass mower, there are prepared a plurality of selectable control modes. In each control mode, there are defined control parameters including a maximal vehicle speed value and a rotational speed of the cutter blade. In response to selection of a control mode suited to a grass cutting work requirement to be now carried out, control parameters such as the maximal vehicle speed value, the cutter blade rotational speed value, etc. which satisfy such work requirement are set in the control table. For instance, in the case of the selected control mode which places importance on the ecological aspect, predetermined control parameters that realize not only high energy saving performance but also low noise generation will be set for the maximal vehicle speed value and the cutter rotational speed value. When the maximal vehicle speed is set to such predetermined control parameter value, the vehicle speed realized through an operation on the man-operable vehicle speed controlling tool will be set within a vehicle speed range defined by this control parameter value. With this, the vehicle speed range for use in the grass cutting operation to now be carried out will be a range suitable for the selected control mode (e.g. ecology-priority mode). Similarly, the cutter blade rotational speed value too will be set to one suitable for the selected control mode (e.g. the ecology-priority mode). In this way, for a grass cutting operation involving a plurality different work requirements too, with selection of a control mode suitable for a given work requirement, the grass cutting operation suitable for this work requirement can be carried out without requiring skilled driving technique.

With a grass mower, a grass cutting work is carried out by causing the vehicle body to travel with rotating the cutter blade. Therefore, the higher the vehicle speed and the greater the amount of grass planted per unit area, the greater the grass cutting amount per unit period, thus increasing the rotational load to the cutter blade. Such increase in the rotational load will invite reduction in the cutter blade rotational speed. And, this reduction in the cutter blade rotational speed adversely affects the cut grass quality. Further, with the grass mower, the vehicle speed will not usually be changed frequently during a grass cutting work. And, the vehicle will generally travel constantly at its highest speed. Accordingly, in case there occurs reduction in the cutter blade rotational speed, by suppressing the maximal speed, the vehicle speed during work will be reduced, thereby to reduce the rotational load to the cutter blade. For this reason, according to one preferred embodiment, the grass mower further comprises a maximal vehicle speed value changing section for changing the maximal vehicle speed value in the control table, based on a cutter blade rotational speed which is a detected rotational speed of the cutter blade.

In case the maximal vehicle speed is varied based on a cutter blade rotational speed, if the maximal vehicle speed is changed in response to even a slight change in the cutter blade rotational speed, this will render the vehicle body traveling unstable, thus causing a trouble in the grass cutting work. Conversely, in a situation when the cutter blade rotational speed decreases significantly below a reference value, it is necessary to reduce the maximal vehicle speed value in correspondence therewith. For this reason, according to one preferred embodiment, in the control table, there are set a low cutter blade rotational speed range in which the maximal vehicle speed is increased as the cutter blade rotational speed becomes higher, and a high cutter blade rotational speed range in which the maximal vehicle speed is maintained constant irrespectively of the cutter blade rotational speed.

According to one preferred embodiment, the control modes include a full power mode for obtaining high grass cutting performance and an eco mode (ecological mode) for energy saving and noise reduction; and a maximal vehicle speed value in the high cutter blade rotational speed range in the full power mode is set higher than a maximal vehicle speed value in the high cutter blade rotational speed range in the eco mode. With this arrangement, in the full power mode, the maximal vehicle speed is set to a high level, such that the grass cutting capability can be achieved fully. Also, in the eco mode, the maximal vehicle speed is set to a level lower in comparison with the full power mode. So that, even if the man-operable vehicle speed controlling tool is operated to the highest speed, energy saving and low noise generation are still realized.

The cutter blade rotational speed varies also according to density and size/stem-diameter of the grass to be cut. When the rotational load to the cutter blade is small, sufficient grass cutting work is possible even at a low cutter blade rotational speed and high energy saving effect is achieved. In particular, if the cutter blade obtains rotational power from an electric motor relying on a battery as a power source, power consumption amount of the battery can be reduced advantageously with lower cutter blade rotational speed. For this reason, according to one preferred embodiment, the cutter blade control target value calculation section calculates the rotational speed control target value, based on a rotational load to the cutter blade.

With the grass mower according to the present invention, a plurality of control modes are provided and combination of suppression of the maximal vehicle speed and cutter blade rotational speed suitable to the characteristics of each control mode is assigned to this control mode. Therefore, it is important for the control of the vehicle speed and the cutter blade rotational speed to be executed speedily. Further, it is desired that the configuration of the grass mower is such that energy saving and low noise generation be positively realized through such control. For this reason, according to one preferred embodiment, the grass mower further comprises a battery; wherein each of the variable speed drive mechanism and the cutter blade drive mechanism includes an electric motor associated therewith connected to the battery as its drive source. If such an electrically powered grass mower is provided with such control modes as a control mode that allows implementation of a utility work for a longer period with low battery power consumption and low noise generation, and a control mode that allows implementation of a utility work utilizing the maximal power even for a shorter period of use, it becomes possible to effect an appropriate grass cutting work without relying on the level of skill of the driver.

Further and other features and advantageous effects achieved thereby will become apparent upon reading the following detailed description with reference to the accompanying drawings.

DETAILED DESCRIPTION OF PREFERRED EMBODIMENTS

Figure 1:
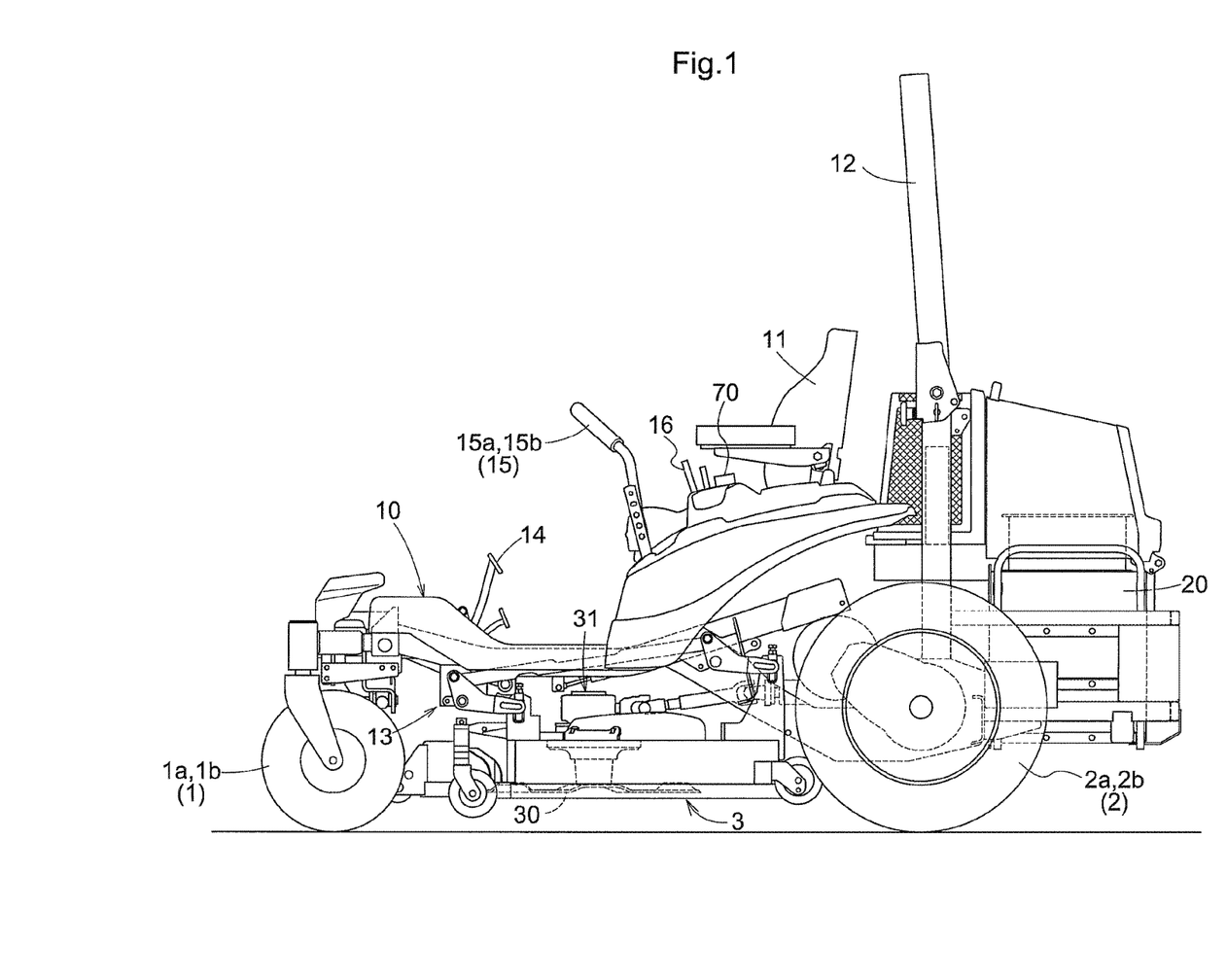
FIG. 1 shows one embodiment and is a side view showing an electrically powered zero-turn mower as an one example of a grass mower.
Figure 2:
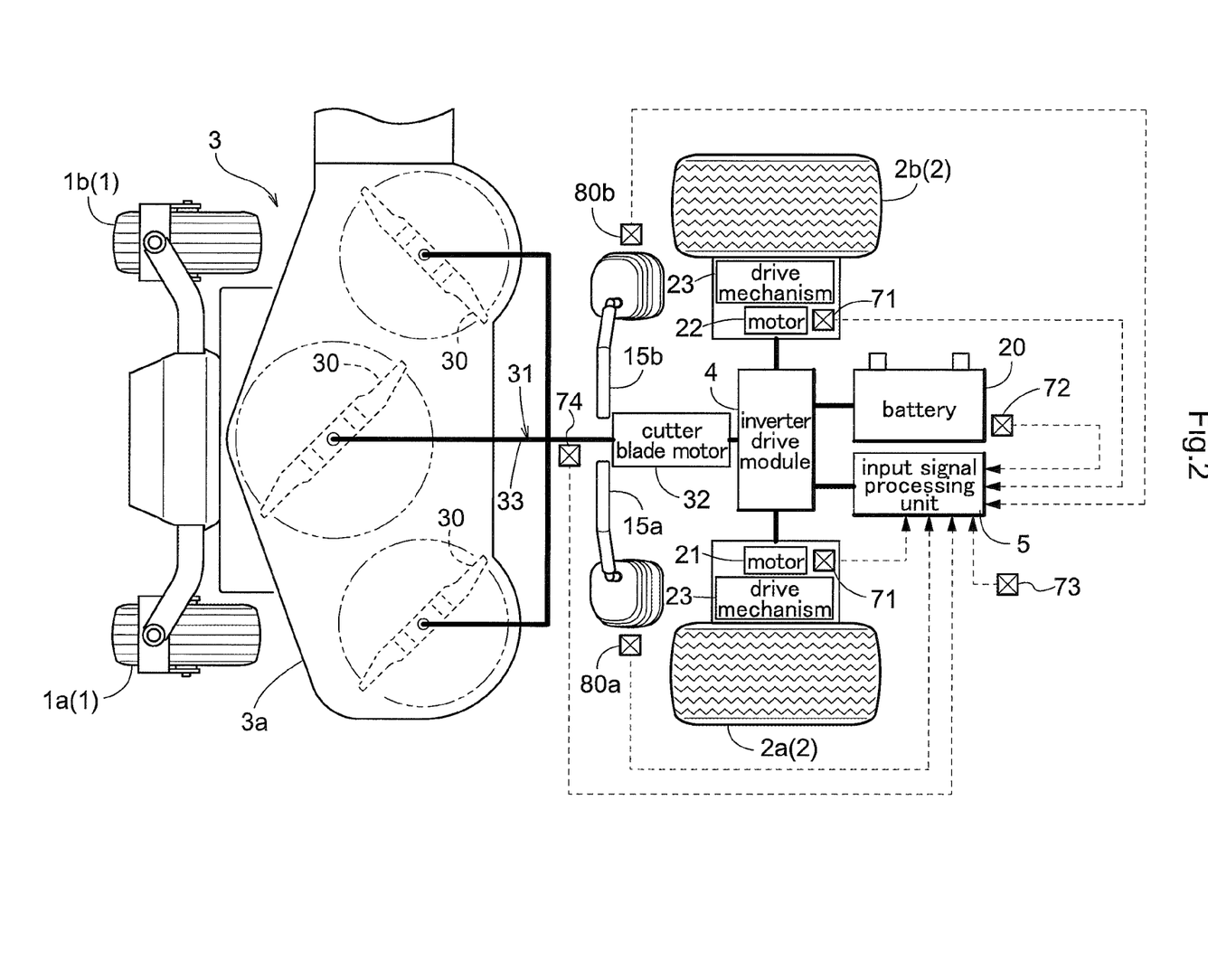
FIG. 2 is a system diagram showing an electric system and a power system of the zero-turn mower.

Next, with reference to the accompanying drawings, one embodiment of a grass mower will be described. In the instant embodiment, the grass mower comprises a zero-turn mower that includes a drive wheel unit 2 consisting of a left rear wheel 2a and a right rear wheel 2b which are driven independently of each other and that mounts a mower unit 3 on a vehicle body 10. FIG. 1 is a side view of the zero-turn mower. FIG. 2 schematically shows an electric system and a power system of the zero-turn mower.

[General Configuration]

The zero-turn mower includes the vehicle body 10 supported by a front wheel unit 1 consisting of a left front wheel 1a and a right front wheel 1b which are freely rotatable caster wheels, and the drive wheel unit 2. At a rear portion of the vehicle body 10, a battery 20 is disposed. Forwardly of the battery 20, a driver's seat 11 is disposed. Rearwardly of the driver's seat 11, a ROPS (rollover protection system) frame 12 is mounted erect. In a space downwardly of the vehicle body 10 between the front wheel unit 1 and the rear wheel unit 2, the mower unit 3 is suspended from the vehicle body 10 to be lifted up/down via a lift link mechanism 13.

Forwardly of the driver's seat 11, there is provided a floor plate which constitutes a foot rest for the driver, and a brake pedal 14 extends upward through the floor plate. On the opposed sides of the driver's seat 11, there is provided a man-operable speed controlling tool 15 consisting of a left maneuvering lever 15a and a right maneuvering lever 15b, each being pivotable about a horizontal pivot axis extending in a vehicle body transverse direction. This man-operable speed controlling tool 15 is operated from a zero vehicle speed position to a maximal vehicle speed position which forms the pivotal end. Further, in the vicinity of the driver's seat 11, there are provided a PTO lever 16 for switching ON/OFF power transmission to the mower unit 3 and a mode selection section 70 for selecting control modes to be described later.

As shown in FIG. 2, there are provided a left motor 21 and a right motor 22 which together constitute a traveling motor unit for feeding rotational power to the left rear wheel 2a and the right rear wheel 2b. The left motor 21 and the right motor 22 have respective rotational speeds thereof varied independently of each other by amounts of electric power fed thereto via an inverter drive module 4. Accordingly, the rotational speeds of the left rear wheel 2a and the right rear wheel 2b can be adjusted separately, so that the vehicle body 10 makes a turn due to a difference between the left and right wheels. Incidentally, in this instant embodiment, for effecting power transmissions between the left motor 21 and the left rear wheel 2a and between the right motor 22 and the right rear wheel 2b, respective traveling drive mechanisms 23 are provided. In case the left motor 21 and the right motor 22 comprise an in-wheel motor, the drive mechanisms 23 can be omitted. In the instant embodiment, the variable speed drive mechanism for driving the drive wheel unit 2 is constituted of the left motor 21, the right motor 23 and the drive mechanisms 23.

The mower unit 3 comprises a side-discharge type having three cutter blades and includes a mower deck 3a and three rotary cutter blades 30 as shown in FIG. 2. Needless to say, it is also possible to employ a two cutter bade type or a one cutter blade type. A cutter blade drive mechanism 31 for rotatably driving the cutter blades 30 is comprised of a cutter blade motor 32 and a cutter blade power transmission mechanism 33 for transmitting power of the cutter blade motor 32 to the cutter blades 30. In this embodiment, the cutter blade drive mechanism for rotatably driving the cutter blades 30 consists of the cutter blade motor 32 and the cutter blade power transmission mechanism 33.

Grass clippings cut and processed by the cutter blades 30 by causing the vehicle body 10 to travel with rotating the cutter blades 30 will be carried by air current generated by wind turbine blades of the cutter blades 30 and a baffle plate, through the inside of the mower deck 3a to one lateral end side where a discharge opening is located, so that the grass clippings will be discharged through this discharge opening provided at the one lateral end side to the lateral outer side of the mower deck 3a.

As shown in FIG. 2, power supply to the left motor 21 and the right motor 22 for traveling and power supply to the cutter blade motor 32 for grass cutting are effected by the inverter drive module 4. The inverter drive module 4 is connected to the battery 20. Incidentally, the power supply to the cutter blade motor 32 is also effected by the inverter drive module 4.

The inverter drive module 4 outputs drive currents to the left motor 21 and the right motor 22 based on control target signal from an input signal processing unit 5. For generating such control target signal, the inverter drive module 4 receives an input of an operation detection signal (a signal indicative of an operational position of the left maneuvering lever 15a) from a left operation amount detection sensor (an example of an "operation detection section") 80a for detecting a pivotal angle (operation position) of the left maneuvering lever 15a; and also an input of an operation detection signal (a signal indicative of an operational position of the right maneuvering lever 15b) from a right operation amount detection sensor (an example of an "operation detection section") 80b for detecting a pivotal angle (operation position) of the right maneuvering lever 15b. When the left maneuvering lever 15a is operated from a pivotal neutral position (neutral) to the pivotal end which is the maximal vehicle speed position, the maximal vehicle speed is provided at the left rear wheel 2a. When the right maneuvering lever 15b is operated from a pivotal neutral position (neutral) to the pivotal end which is the maximal vehicle speed position, the maximal vehicle speed is provided at the right rear wheel 2b. The pivotal start end positions of the left maneuvering lever 15a and the right maneuvering lever 15b are zero vehicle speed positions. Incidentally, when the left maneuvering lever 15a and the right maneuvering lever 15b are operated to one side from the pivotal neutral positions, a forward rotation is provided. When the levers 15a, 15b are operated to the other side, a reverse rotation is provided.

In the instant embodiment, as function control modes of the control system of the zero-turn mower, there are provided an eco mode, a standard mode and a full power mode. The eco mode is a mode intended to obtain utility work for an extended period and low noise generation (noise reduction) with suppression of electric power consumption. The standard mode is a mode intended to obtain good balance between grass cutting performance and electric power consumption. The full power mode is a mode intended to obtain maximal grass cutting performance with substantially no limit being imposed on the output. The mode selection section 70 is used for the driver to select a control mode suitable for a utility work to be now carried out from among the above-described control modes.

[Control System]

Figure 3:
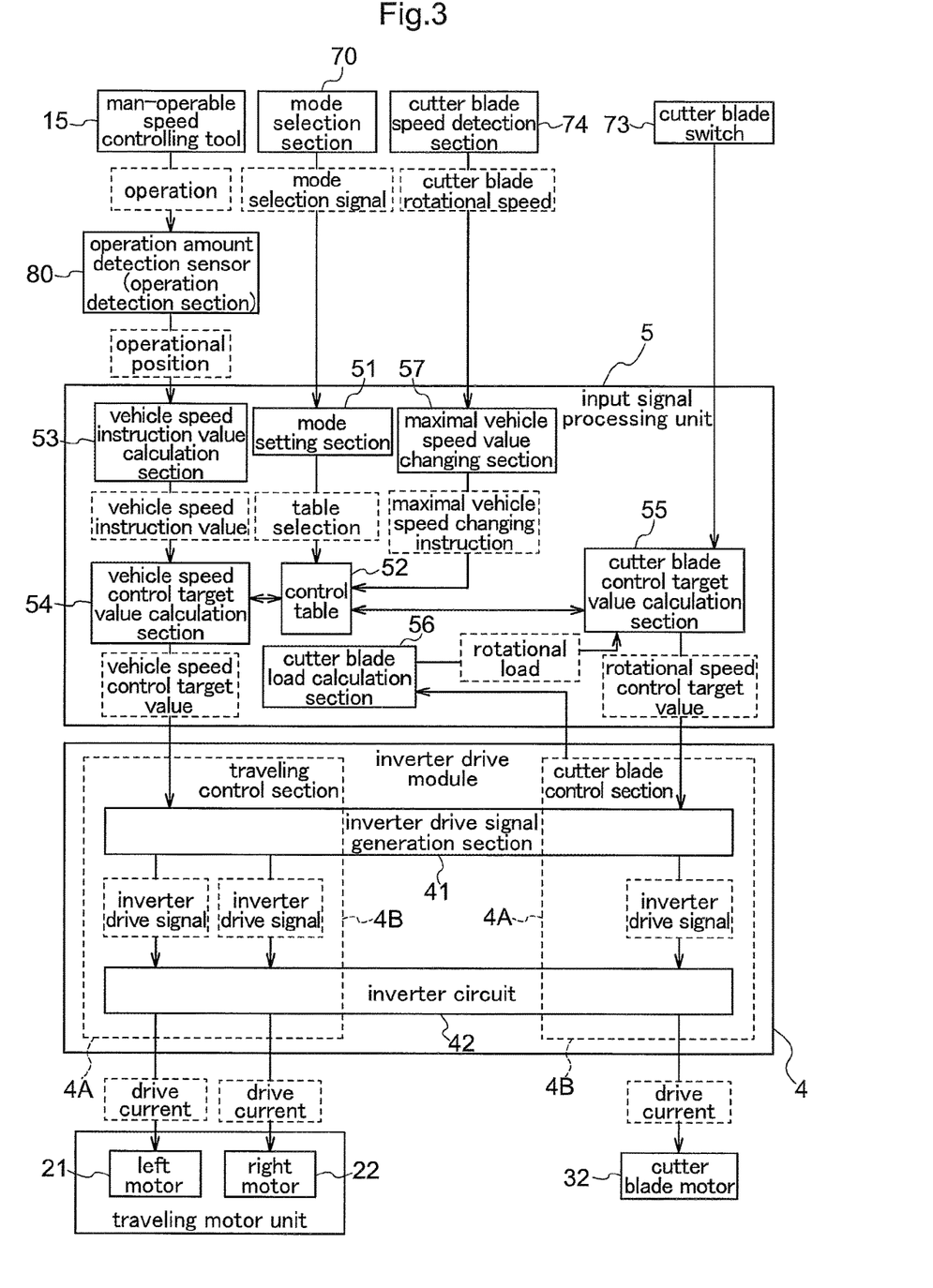
FIG. 3 is a functional block diagram of a control system of the zero-turn mower.
Figure 4:
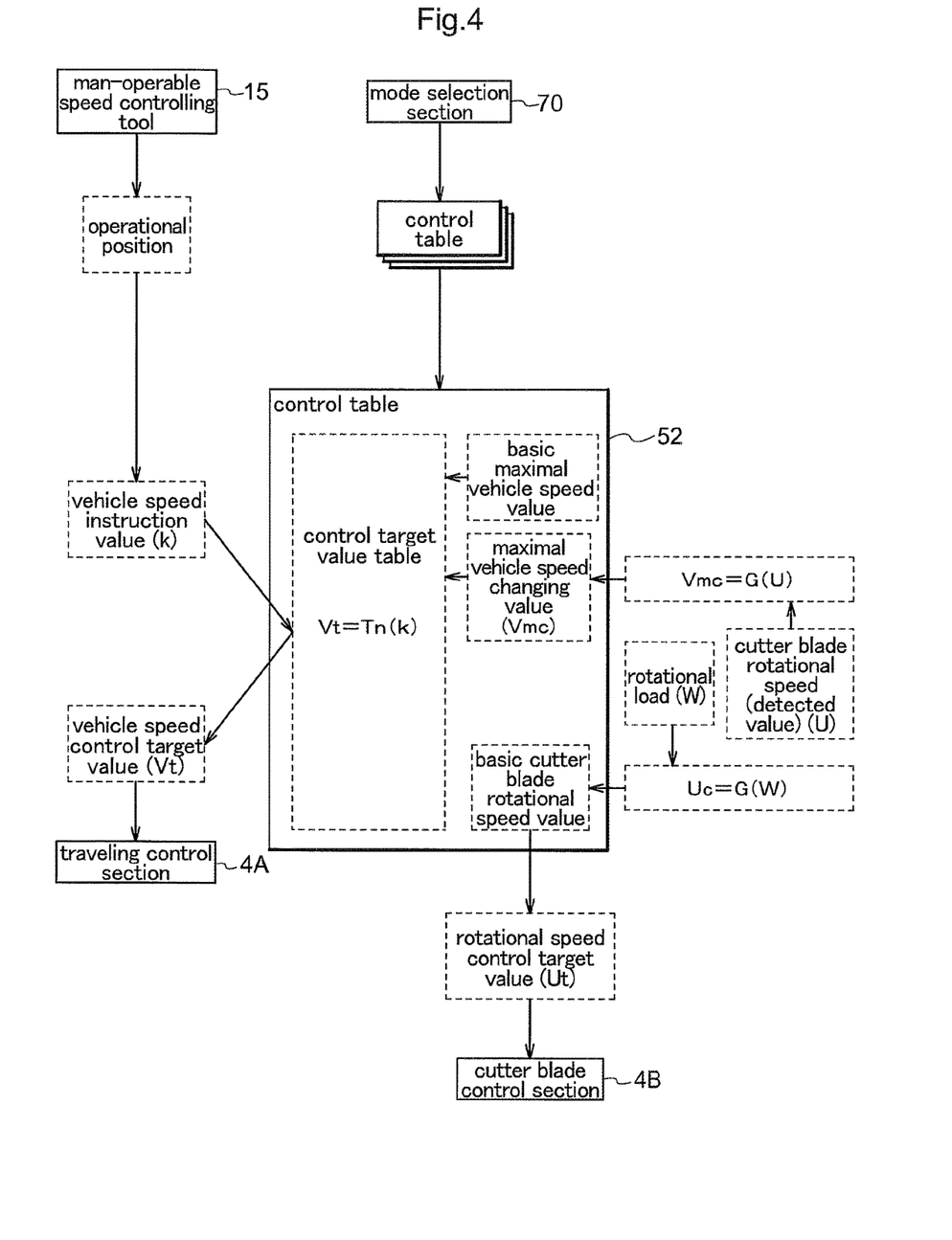
FIG. 4 is a diagram showing data flow for calculations of a vehicle speed control target value and a rotational speed control target value in a selected control mode.

FIG. 3 is a functional block diagram of the control system of the zero-turn mower. FIG. 4 is a schematic showing data flow for calculation of a vehicle speed control target value and a rotational speed control target value in a selected control mode. This control system consists essentially of the input signal processing unit 5 and the inverter drive module 4. The input signal processing unit 5 processes detection signals from sensors, switches, etc. and convert them into a predetermined signal format and give them to the inverter drive module 4.

To the input signal processing unit 5, there is connected an operation detection section 80 configured to detect operations on the man-operable speed controlling tool 15 and then output its operation positions. Specifically, to the input signal processing unit 5, there are connected an operation amount detection sensor 80a for detecting an operation position of the left maneuvering lever 15a and outputting an operation detection signal; and an operation amount detection sensor 80b for detecting an operation position of the right maneuvering lever 15b and outputting an operation detection signal (see FIG. 2). Further, to the input signal processing unit 5, there are also connected the mode selection section 70 configured to output a mode selection signal indicative of a selected control mode; a cutter blade switch 73 configured to output an ON signal or an OFF signal in response to an operation on the PTO lever 16; and a cutter blade speed detection section 74 configured to detect a rotational speed of the cutter blades 30 and outputs the rotational speed. In addition thereto, to the input signal processing unit 5, there are further connected the sensor group including a speed detection section 71 and a battery remaining charge detection section 72 (see FIG. 2). The speed detection section 71 comprises a sensor for detecting a vehicle speed, which is configured to detect any one of motor rotational speeds of the left motor 21 and the right motor 22, rotational speeds of the drive mechanisms 23 and a rotational speed of the drive wheel unit 2, and outputs a vehicle speed value (see FIG. 2). The battery remaining charge detection section 72 is configured to detect a battery remaining charge amount which is an amount of charge remaining in the battery 20 or a battery capacity.

The input signal processing unit 5 includes a mode setting section 51, a control table 52, a vehicle speed instruction value calculation section 53, a vehicle speed control target value calculation section 54, a cutter blade control target value calculation section 55, a cutter blade load calculation section 56 and a maximal vehicle speed changing section 57.

When the mode setting section 70 is operated to select a particular control mode, a signal indicative of the selected control mode is given to the mode setting section 51. Then, based on the selected control mode, the mode setting section 51 sets the control table 52 for realizing this control mode. Specifically, the mode setting section 51 writes control parameters (control table values) prepared for the selected control mode into the control table 52. With this, a basic cutter blade rotational speed value (an example of control parameter) and a basic maximal vehicle speed value (an example of control parameter) which are suitable for the characteristics of the selected control mode are defined.

[Control Parameters for Respective Control Modes]

Figure 5:
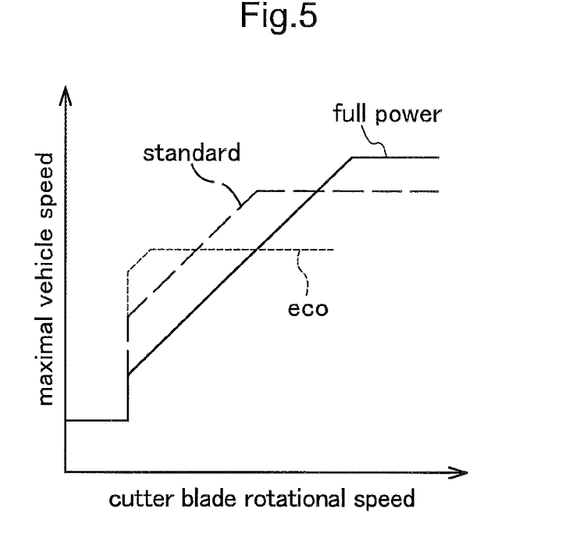
FIG. 5 is a graph showing relationship between a cutter blade rotational speed and a maximal vehicle speed which differs for each control mode.
Figure 6:
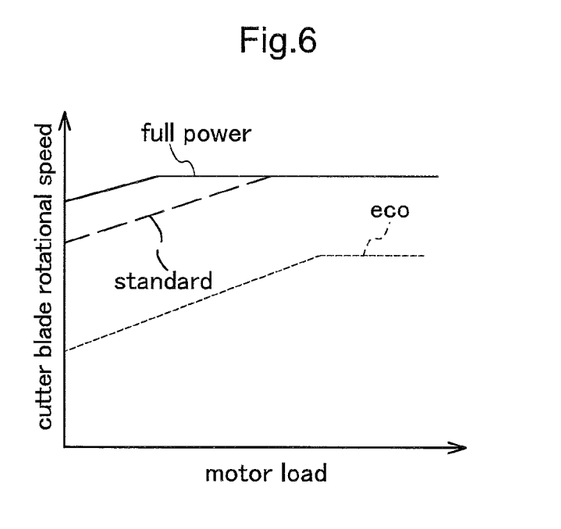
FIG. 6 is a graph showing relationship between a motor load and the cutter blade rotational speed which differs for each control mode.

FIG. 5 and FIG. 6 illustrate control parameters defined by each control mode. In these figures, the eco mode is represented by a thin dotted line, the standard mode is represented by a sparsely dotted line, and the full power mode is represented by a solid line.

FIG. 5 is a graph which defines, for each control mode, relationship between the cutter blade rotational speed detected by the cutter blade speed detection section 74, and the maximal vehicle speed instruction value. In the example illustrated in FIG. 5, in each and every control mode, there are set a "low cutter blade rotational speed range" in which the maximal vehicle speed is increased (goes upward in FIG. 5) as the cutter rotational speed becomes higher (rightward in FIG. 5); and a "high cutter blade rotational speed range" in which the maximal vehicle speed is maintained constant even when the cutter rotational speed becomes higher. A constant value, at which the maximal vehicle speed remains unchanged even when the cutter blade rotation speed becomes higher, is greatest in the full power mode, which mode is followed by such constant value in the standard mode and then by such constant value in the eco mode. In any case, at a high cutter blade rotational speed which is normally employed, the maximal vehicle speed instruction value is maintained constant, even when the cutter blade rotational speed decreases to some extent, whereby the stability of working traveling is ensured. Further, in order to allow the vehicle body 10 to keep traveling even when large reduction in the cutter blade rotational speed occurs at the time of high load, a low limit value is set for the maximal vehicle speed derived from the cutter blade rotational speed, and this lower limit value is set to a value more than zero (i.e. exceeding a zero vehicle speed value).

FIG. 6 is a graph showing relationship between a motor load for the cutter blade motor 32, and the cutter blade rotational speed. The control based on this graph will be used when it is desired to suppress consumed electric power, by reducing the cutter blade rotational speed in response to reduction in the motor load. In all of the control modes, in the range where the motor load is high, the cutter blade rotational speed is maintained constant, whereas in the region where the motor load is low, the lower the motor load, the lower the cutter blade rotational speed. Incidentally, in general, the motor load is low when a motor current value is low. And, when the motor current value is high, the motor load is high. Therefore, the horizontal axis in FIG. 6 can be caused to represent the motor current value.

As another control parameters (control table values) to be written into the control table 52, there are determined a "basic cutter blade rotational speed", and a "cutter blade rotational speed after vehicle body stop" which is a speed after lapse of a predetermined period (e.g. 5 seconds) subsequent to temporary stop of the vehicle body 10. For instance, the basic cutter blade rotational speeds are 80 m/s for the eco mode, and 90 m/s for each of the standard mode and the full power mode. In the full power mode, even if the vehicle body 10 is stopped temporarily, rotational speed of the cutter blades 30 is not reduced, in preparation for a next working traveling.

With the zero-turn mower, based on an operation position of the man-operable speed controlling tool 15, the rotational speed of the traveling motor unit consisting of the left motor 21 and the right motor 22 is adjusted. This adjustment is restricted by a set control mode. Therefore, firstly, the vehicle speed instruction value calculation section 53 calculates a vehicle speed instruction value, based on operation detection signals from the operation amount detection sensors 80a, 80b. The calculated vehicle speed instruction value is sent to the vehicle speed control target value calculation section 54. The vehicle speed control target value calculation section 54 calculates a vehicle speed control target value, with using the various control parameters and/or lookup tables that are defined in the control table 52.

Incidentally, in the instant embodiment, the maximal vehicle speed value changing section 57 is provided. This maximal vehicle speed value changing section 57 determines a maximal vehicle speed from the detected current cutter blade rotational speed. More particularly, the maximal vehicle speed value changing section 57 gives a maximal vehicle speed changing instruction to the control table 52. The maximal vehicle speed changing instruction demands that a maximal vehicle speed value, derived from the current cutter blade rotational speed with using the graph shown in FIG. 5, be set as a newest maximal vehicle speed value. Therefore, if the vehicle speed instruction value calculated by the vehicle speed instruction value calculation section 53 is a value (operation position) indicating the maximal vehicle speed, the vehicle speed control target calculation section 54 outputs the maximal vehicle speed value set in the control table 52 as the vehicle speed control target value. Namely, even for a same operation position of the man-operable speed controlling tool 15, a maximal vehicle speed to be actually created by the cutter blade rotational speed will differ.

The cutter blade control target value calculation section 55 generates a rotational speed control target value (including rotation starting/stopping instruction) to be given to the inverter drive module 4, based on an ON/OFF signal from the cutter blade switch 73, and control parameters related to the cutter blade rotational speed set in the control table 52. Further, the cutter blade control target value calculation section 55 adjusts the rotational speed control target value, in accordance with a cutter blade rotational speed which is determined based on the rotational load calculated by the cutter blade load calculation section 56.

[Calculation of Vehicle Speed Control Target Value and Rotational Speed Control Target Value]

With reference back to FIG. 4, there will be schematically described data flow for calculating the vehicle speed control target value and the rotational speed control target value in a selected control mode.

When the man-operable speed controlling tool 15 is operated for manually controlling the vehicle speed, its operation position will be handled as a vehicle speed instruction value: k. The control table 52 is switched to one suited to the control mode selected by the mode selection. In this control table 52, there are set a basic maximal vehicle speed value, a basic cutter blade rotational speed, a control target value table (lookup table) which are defined in the selected control mode. This control target value table can be represented by: Vt=Tn (k), since the vehicle speed control target value: Vt is derived, with using a vehicle speed instruction value: k as an argument. As the initial state, the control target value table is set such that the basic maximal vehicle speed value may be derived from the vehicle speed instruction value indicating an operation being made to the maximal vehicle speed position. In this way, in the basic form of the control target value table, the basic maximal vehicle speed value is set as the maximal vehicle speed. However, the maximal vehicle speed is varied according to a detected cutter blade rotational speed. Namely, the maximal vehicle speed changing value: Vmc is derived from a predetermined function: Vmc=G (U), with using a detected cutter blade rotational speed: U as a variable. Therefore, in response to an output of the maximal vehicle speed changing value, the relationship between the vehicle speed instruction value and the vehicle speed control target value in the control target value table will be changed; and if the man-operable speed controlling tool 15 is operated to the maximal vehicle speed position, there is derived a vehicle speed control target value which corresponds to the newest value changed by the maximal vehicle speed changing value, and the derived vehicle speed control target value will be given to the traveling control section 4A.

Since the basic cutter blade rotational speed value set in the selected control table 52 is given as a rotational speed control target value (denoted by Ut in FIG. 6) to the cutter blade control section 4B, basically, the rotational speed control target value comprises the basic cutter blade rotational speed. However, in the instant embodiment, the initially set basic cutter blade speed value will be corrected by a cutter blade rotational speed value (denoted by "Uc" in FIG. 6) that is derived by the cutter blade speed changing function: G, with using the rotational load: W to the cutter blade motor 32 as a variable thereof. Namely, upon start of working traveling, the rotational speed control target value will vary depending on the rotational load to the cutter blades 30. One example of the cutter blade speed changing function: G is the graph shown in FIG. 6.

As shown in FIG. 3, the inverter drive module 4 includes an inverter drive signal generation section 41 and an inverter circuit 42. The inverter drive signal generation section 41 generates an inverter drive signal for driving the inverter circuit 42, based on a control target signal transmitted from the input signal processing unit 5. Then, based on the inverter drive signal, the inverter circuit 42 effects inverter operation and creates a driving current. Incidentally, the control target signal and the inverter drive signal are processed independently between those for the left motor 21 and those for the right motor 22; and respective drive currents will be fed to the left motor 21 and the right motor 22. Whereby, the left rear wheel 2a and the right rear wheel 2b are rotated in correspondence with operation amounts of the left maneuvering lever 15a and the right maneuvering lever 15b, respectively. Incidentally, a speed control and/or a torque control can be employed as driving control for the left motor 21 and the right motor 22 by the inverter drive module 4.

A cutter blade drive instruction including a rotational speed control target value is given from the cutter blade control target value calculation section 55 to the inverter drive module 4. Then, in response to such cutter blade drive instruction, the inverter drive signal generation section 41 generates an inverter drive signal to activate the inverter circuit 42. Drive current generated in the inverter circuit 42 is fed to the cutter blade motor 22, whereby the cutter blade motor 22 is rotated.

In the instant embodiment, the inverter drive signal generation section 41 and the inverter circuit 42 that feed the respective drive currents to the traveling motor unit (the left motor 21 and the right motor 22) and the cutter blade motor 32 are commonized. Accordingly, the traveling control section 4A is comprised of a traveling motor portion of the inverter drive signal generation section 41 and a traveling motor portion of the inverter circuit 42. And, the cutter blade control section 4B is comprised of a cutter blade motor portion of the inverter drive signal generation section 41 and a cutter blade motor portion of the inverter circuit 42.

Incidentally, the arrangement disclosed in the foregoing embodiment (including other embodiments) can be used in combination with an arrangement disclosed in other embodiments as long as no contradiction results from such combination. Further, the embodiments disclosed in this specification are only exemplary. Embodiments of the present invention are not limited thereto, but appropriate modifications thereof can be made in a range not deviating from the essential spirit of the present invention.

[Leaf Blower Unit]

Figure 7:
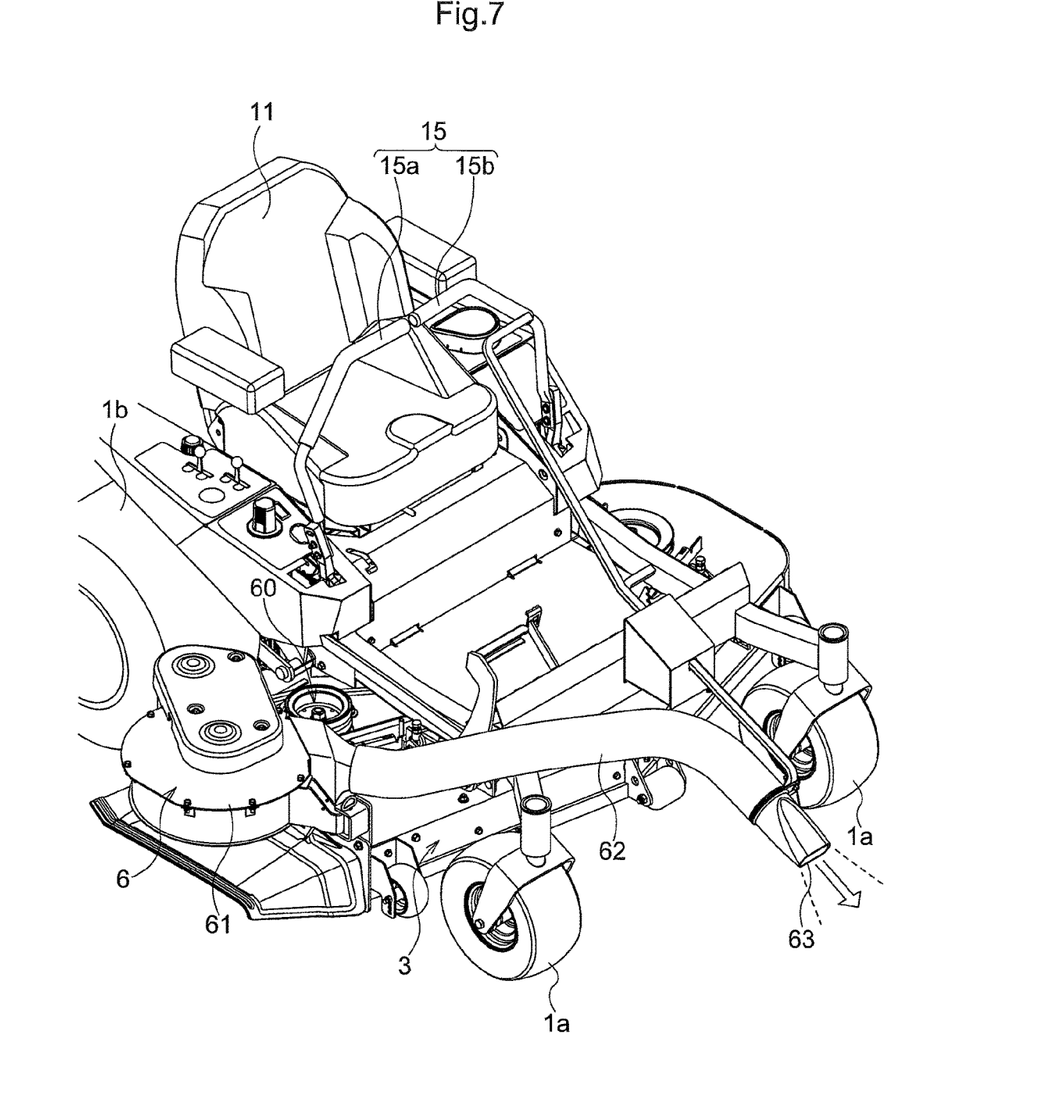
FIG. 7 is a perspective view showing the zero-turn mower mounting a leaf blow unit.

As shown in FIG. 7, this zero-turn mower can mount a leaf blower unit 6 for blowing away dry grass, fallen leaves, etc. The leaf blower unit 6 is a rotary fan type, including a shroud 61 covering an unillustrated fan, a duct 62, and a fan power transmission mechanism 60 for transmitting rotation power to the fan of the leaf blower unit 6. The duct 62 has its one end connected to the shroud 61 and the other end thereof defines an air discharge opening 63 for discharging air. The fan power transmission mechanism 60 receives power taken off the cutter blade power transmission mechanism 33. When the cutter blade motor 32 is rotated, air is discharged through the air discharge opening 63. For the zero-turn mower equipped with such leaf blower unit 6, there is provided a blower mode in which fallen leaves or the like are blown away by the leaf blower unit 6, without effecting any grass cutting work. In this blower mode, regarding the relationship between the cutter blade rotational speed and the maximal vehicle speed, the maximal vehicle speed is maintained constant (basic maximal vehicle speed), irrespectively of the cutter blade rotational speed. Regarding the relationship between the motor load and the cutter blade rotational speed (rotational speed of the cutter blade motor 32) also, the cutter blade rotational speed is maintained constant irrespectively of the motor load. Incidentally, the cutter blade rotational speed after vehicle body stop is set as 50 m/s. Incidentally, in the blower mode, too, it is possible to arrange such that the cutter blades 30 are rotated for generating air current to the leaf blower unit 6, thus increasing the amount of air to be discharged through the air discharge opening 63.

Alternatively, wind turbine portions (wind-generating portions) may be formed on the cutter blades 30 of the mower unit 3. Whereby, only with rotation of the cutter blades 30, a strong air flow is generated inside the mower deck 3a. Therefore, even if the fan-equipped shroud 61 as shown in FIG. 7 is not provided, air current for blowing away fallen leaves or the like may be generated in the leaf blower unit 6 through the air discharge opening 63, just by connecting the duct 62 to the mower deck 3a directly. For such leaf blower mounted mower unit 3 disclosed in the above embodiment, the present invention can be applied by setting the blower mode.

Further, since the mower unit 3 shown in FIG. 1, FIG. 2 and FIG. 7 is the side discharge type, the air current generated by the rotation of the cutter blades 30 will be discharged through the discharge opening provided at one end of the mower deck 3a. If such air current is utilized for blowing away fallen leaves or the like, the mower unit 3 can be used as the leaf blower unit 6, without requiring any additional component such as the duct 62. Therefore, in this embodiment too, the blower mode can be effectively utilized.

OTHER EMBODIMENTS (1) In the foregoing embodiment, the variable speed drive mechanism that drives the drive wheel unit 2 is configured as left/right independent motor type having the left motor 21 for driving the left rear wheel 2a and the right motor 22 for driving the right rear wheel 2b. Instead of this, the variable speed drive mechanism can be comprised of one common traveling motor, a left stepless speed changer configured to speed-change power from the common traveling motor and transmit the changed power to the left rear wheel 2a, and a right stepless speed changer configured to speed-change power from the common traveling motor and transmit the changed power to the right rear wheel 2b.

(2) In the foregoing embodiment, there was shown a so-called zero-turn type grass mower wherein the left rear wheel 2a and the right rear wheel 2b of the drive wheel unit 2 can be driven independently of each other. Instead of this, the grass mower can be configured such that front wheels are configured as steering wheels steered by a steering wheel and the left rear wheel 2a and the right rear wheel 2b are coupled to each other via a differential mechanism.

(3) In the foregoing embodiment, the grass mower was a mid-mount type with the mower unit 3 being mounted between the front wheels and the rear wheels. Instead of this, the mower can be configured as a front-mower type with mounting the mower unit 3 forwardly of the front wheels.

What is claimed is:
1. A grass mower comprising:
a drive wheel unit;
a variable speed drive mechanism for driving the drive wheel unit;
a mower unit having a cutter blade;
a cutter blade drive mechanism for rotatably driving the mower unit;
a man-operable vehicle speed controlling tool which is operated in a range from a zero vehicle speed position to a maximal vehicle speed position;
an operation detection section for detecting an operational position of the man-operable vehicle speed controlling tool;
a vehicle speed instruction value calculation section for generating a vehicle speed instruction value including a maximal vehicle speed, based on the operational position of the man-operable vehicle speed controlling tool detected by the operation detection section;
a mode selection section for selecting a control mode from a plurality of control modes;
a control table in which a plurality of control parameters are set, the control parameters being provided for the respective control modes, each of the control parameters including a rotational speed value of the cutter blade and a maximal vehicle speed value corresponding to the rotational speed value;
a vehicle speed control target value calculation section configured to calculate a vehicle speed control target value, based on a vehicle speed instruction value generated by the vehicle speed instruction value calculation section and a selected control parameter corresponding to the control mode selected by the mode selection section;
a traveling control section configured to control the variable speed drive mechanism based on the vehicle speed control target value;
a cutter blade control target value calculation section configured to calculate a rotational speed control target value for the cutter blade, based on the selected control parameter; and
a cutter blade control section configured to control the cutter blade drive mechanism based on the rotational speed control target value.

2. The grass mower of claim 1, further comprising:
a maximal vehicle speed value changing section for changing the maximal vehicle speed value in the control table, based on a cutter blade rotational speed which is a detected rotational speed of the cutter blade.

3. The grass mower of claim 2, wherein in the control table, there are set a low cutter blade rotational speed range in which the maximal vehicle speed is increased as the cutter blade rotational speed becomes higher, and a high cutter blade rotational speed range in which the maximal vehicle speed is maintained constant irrespectively of the cutter blade rotational speed.

4. The grass mower of claim 3, wherein:
the control modes include a full power mode for obtaining high grass cutting performance, and an eco mode for energy saving and noise reduction; and
a maximal vehicle speed value in the high cutter blade rotational speed range in the full power mode is set higher than a maximal vehicle speed value in the high cutter blade rotational speed range in the eco mode.

5. The grass mower of claim 1, wherein the cutter blade control target value calculation section calculates the rotational speed control target value, based on a rotational load to the cutter blade.

6. The grass mower of claim 1, further comprising:
a battery;
wherein each of the variable speed drive mechanism and the cutter blade drive mechanism includes an electric motor associated therewith connected to the battery as its drive source.

* * * * *